Patented Sept. 11, 1934

1,973,475

UNITED STATES PATENT OFFICE 1,973,475

OXIDIZED MOTOR FUEL

Carleton Ellis, Montclair, N. J., assignor to Ellis-Foster Company, a corporation of New Jersey No Drawing. Application April 4, 1923,
Serial No. 629,799½

3 Claims. (Cl. 44—9)

This invention relates to an oxidized motor fuel and to the process of making same and relates particularly to a blended motor fuel comprising oxidized hydrocarbons admixed with oxidized products. When a petroleum oil such for example as kerosene is subjected to oxidation by contact with air or oxygen at an elevated temperature, in the presence or absence of a catalyst, oxidized products are obtained which are of value in motor fuel compositions especially when suitably blended with volatile hydrocarbons which have not been subjected to the oxidizing treatment. In making a product suitable for use as a substitute for gasoline having the requisite ignition and other qualities ordinary kerosene has been frequently employed in amount ranging from 10 to perhaps 50 per cent, the balance of the composition usually being gasoline, a portion of which has a very high degree of volatility. Mixtures of this kind although relatively cheap have the disadvantage of producing engine knock and in the present invention one object is to provide a composition which may contain a considerable proportion of heavier products and at the same time not produce engine knock in an objectionable degree.

As indicated in Patent 1,864,717 issued June 28, 1932, if heavy oil is placed under pressure and heated to 400 or 500° C. and air is blown therethrough reaction takes place with the formation of various products of oxidation. If the oxygen is allowed to travel through the oil at a slow rate of speed it may be completely absorbed. Thus by heating the oil to a cracking temperature or slightly below it and passing therethrough a current of air the oil is gradually converted to gasoline or motor fuel of an oxidized character and other oxidized condensible bodies likewise are formed together with fixed gases. It is also possible to add to the air current or oxygen-containing gas passing through the oil a quantity of steam, say from a few per cent and upwards by volume reckoned on the volume of air employed. The oxidation by the air current is an exothermic one and if a large bulk of oil is being rapidly treated the temperature may rise undesirably high. The addition of steam therefore in some cases has the advantage of cooling the liquid and preventing the accession of a temperature too high for appropriate operation. A larger percentage of steam may be employed if the air is enriched with oxygen. On the other hand the nature of the operation may be such that the use of steam as a diluent is objectionable because of depression of the temperature to too great an extent.

The process may be carried out with suitable preheaters or heat interchangers so that the incoming current of air is heated considerably before contacting with the oil. The products of the operation are passed through condensers and finally any residual gas and vapors if desired may be treated with activated carbon or silica gel, preferably under pressure to remove as far as possible the last portions of vapors carried in the current of fixed gases.

As stated in Patent 1,864,717 issued June 28, 1932, gas oil may be treated in pressure stills to produce gasoline. The residues from the pressure stills which are not further amenable to ordinary cracking may be run off into an oxidizer there to be subjected to the action of a preheated current of air at a pressure of say 10 to 25 atmospheres. Oxidation of the residues with formation of additional oxidized gasoline, oxidized kerosene and sometimes also various water-soluble oxygen containing products occurs. By carrying out oxidation in this manner an oxidized motor fuel is obtained which contains oxidized gasoline, oxidized kerosene etc. While the material may be used in this form as a motor fuel preferably in accordance with the preferred embodiment of the present invention this oxidized kerosene, oxidized gasoline etc. is blended with gasoline which has not been oxidized. Thus ordinary natural gasoline may be used for blending purposes, casing head naphtha and preferably gasoline from pressure stills as stated in Patent 1,864,717 issued June 28, 1932. A mixture of the oxidized fuel, pressure still gasoline and natural gasoline also may be made constituting a desirable blend.

As noted in Serial 524,697, ordinary kerosene may be oxidized for example in the following manner. The kerosene is passed through a cracking tube heated to 540-590° C. The products from the cracking tube are passed through a trap to remove very heavy products and the vapors and fixed gases are passed into a mixing chamber where they are mingled with air. The mixture of oil vapors and air is then passed into a catalyzer tube containing fragments of pumice impregnated with canadium oxide. The catalyzer is situated in a U tube of sheet steel the tube being immersed in a bath of molten lead. The temperature of the latter is held at about 425-430° C. The products issuing from the catalyzer tube are passed through a condenser and then into a scrubbing apparatus containing water. The gases and vapors then are passed into oil scrubbers and finally to a container in which is placed a quantity of silica gel. In an experiment carried out in this manner the vapors which passed through several scrubbers containing water or oil were not completely absorbed and silica was found useful to remove the fume suspended in the fixed gases. In the water scrubber and also in the oil scrubbers a certain amount of oily material was collected and found to have an acid reaction. This material contained oxidized gasoline, oxidized kerosene etc. capable of being used in making the blend corresponding to the preferred form of the present invention. As stated in said application there are present in such oxidation products, various organic bodies such as ketones, aldehydes, and the like.

As also stated in Serial 524,697 it is possible to vaporize kerosene without actually cracking the oil and to mix it with preheated air so that condensation of the vapors does not occur. The mixture is passed through a mass of heated catalyzer in order to bring about oxidation. In this case it is possible to have the speed of travel with reference to the temperature of the catalytic mass such that free oxygen is obtained in the exit gases. Kerosene which has been oxidized in this manner may be admixed with natural gasoline or pressure still gasoline or with both of these fuels to make a motor fuel blend.

Thus one part of the oxidized gasoline may be mixed with two parts of natural gasoline or with an equal volume of pressure still gasoline. One part of oxidized kerosene may be mixed with four parts of natural gasoline or with a like amount of pressure still gasoline. One part of oxidized kerosene, one part of benzol and three parts of pressure still gasoline likewise may be admixed. In some cases alcohol as for example ordinary ethyl or denatured alcohol may be added to the extent of 5 or 10 per cent or in larger quantities if desired. To the motor fuel blend various other volatile combustible liquids may be added including acetone, ether and various esters and the like.

Another feature of the invention is that of cracking petroleum hydrocarbons to produce a certain amount of aromatic bodies and oxidizing the mixture so as to obtain products of oxidation, in which aliphatic and aromatic compounds may exist in a more or less oxidized condition and in using appropriate distillates or "cuts" by themselves as a motor fuel although preferably blending such distillates with pressure still gasoline or ordinary gasoline, kerosene and the like. Thus starting with a petroleum hydrocarbon such as kerosene the steps of cracking and oxidation may be conducted to yield a motor fuel containing aromatic bodies among the products of oxidation. Likewise other light or heavy petroleum oils, residues and the like may be employed for the production of aromatic products of cracking and oxidation adapted for use in the preparation of motor fuel. When heavy oils are used mixtures of oxidized kerosene and gasoline containing aromatic bodies may be obtained which may be rectified by distillation to include as much or as little of the kerosene constituents as is desired. This will depend upon the use to which the fuel is put, the character of carburettor employed and other conditions.

A desirable temperature for carrying out oxidation is that of incipient red heat. It is particularly that range of temperature just above a black heat but not a decided red heat.

In one form of process described in Serial 538,338 an amount of oxygen is used insufficient for wide spread oxidation and hence a substantial portion of the hydrocarbons produced by cracking or originally present in the oil may pass through the heating zone in an unburnt or unoxidized condition. These may be collected by condensation and a mixture of light hydrocarbons obtained on rectification which is useful as a gasoline substitute. Among the oxygen-containing products obtained as disclosed in that application are oxygen-containing aromatic compounds. Oftentimes it is desirable to separate from such hydrocarbons as much of the oxygen-containing material as may be useful in other ways; but any oxidized material not of value otherwise but which is useful in a volatile fuel may be left with the hydrocarbons. An acid such as phthalic acid which may be extracted readily from hydrocarbons by treatment with caustic soda solution and which has a relatively high market value may of course be removed from the fuel. As stated in Serial 538,338 the process serves therefore to provide both gasoline or a gasoline substitute with or without certain partially oxidized bodies and also provides products of intermediate combustion or oxidation of value for purposes other than as a fuel. Such gasoline may include any kerosene in an unchanged or in an oxidized condition which may be desirable in the fuel in question.

As an example of the method of producing such oxidation products as set forth in my prior application No. 538,338 referred to above, the following is given. Kerosene was allowed to drip at a regular rate of flow into the cracking furnace which was maintained at a cracking temperature preferably between 500 and 600° C. The cracked vapor was passed through an air-cooled condenser and the higher boiling oils condensed and collected in a suitable receiver. The cracked vapors were passed into a Venturi tube where they were mixed with the air supply. The air supply was obtained by means of a positive pressure blower and was first passed through a gas meter and then through a gas scrubbing tower containing copper sulphate to remove sulphur compounds, and into a gas scrubbing tower containing sulphuric acid in order to remove any moisture present in the air. Finally the dried air was passed into a humidifying tower containing water in order that the air should have a definite water content throughout the remainder of the operation. The air was then passed on into a mixing chamber or Venturi tube where it was thoroughly mixed with the cracked oil vapors. If not sufficiently cooled the mixture of cracked oil and air may be passed through a water cooled condenser or other cooling device and on into the oxidizing chamber. The cloud entering the oxidizing chamber was approximately at room temperature. At the point where the gases enter the U-tube, a somewhat violent reaction may take place as shown by the deposition of carbonaceous material at this point. If the entering gases possess a high temperature this undesirable reaction is favored. With hot entering gases the deposition of carbon may be such that at the end of between 4 and 5 hours it is necessary to open the tube and remove this carbon deposit. The cool mixture of air and oil mist was passed through the leg of the tube containing pumice and then through the leg containing pumice which had been coated with oxide of vanadium.

With the lead bath at a temperature of 425–450° C. the temperature of the exit gases at a point just above the catalytic mass was 320–360° C. The gas stream containing the oxidized petroleum was passed through a condenser where a considerable portion of the condensable material was condensed and the condensate collected in a receiving vessel. The stream containing considerable material in the form of a cloud or mist was scrubbed by passing through a gas scrubbing tower containing oil where the bulk of the oil-soluble material was removed. Finally the stream was passed through a water scrubbing tower which removed a considerable quantity of water soluble material from the gas and the residue of the mist was recovered by passing through silica gel.

The condensate obtained above contained a material which separated into two layers, a water-soluble layer and an oily layer, both of which has a distinctly acid reaction. The volume of the aqueous solution in the condensing tower was four times that removed from the gas humidifying tower. The oil condensed and scrubbed from the gas stream was about twelve and a half per cent of the original quantity of oil passed into the cracking chamber. The oil condensed between the Venturi tube and the cracking chamber was about 20 per cent of the kerosene passed into the furnace. The ratio of air to kerosene passed through the apparatus was 34 cubic feet per liter of kerosene.

Thus when kerosene is the raw material which is being cracked and oxidized a portion of the kerosene will be converted into light volatile products resembling gasoline, another portion may be converted into aromatic bodies, still another portion will be converted into products heavier than kerosene and a portion of the oil may pass through the cracking treatment without substantial change. When this mixture is treated at an elevated temperature with air under pressure or when passed admixed with air through a catalytic mass these various constituents are oxidized to greater or less degree and in many cases some of the constituents originally present in the kerosene will find their way into the oxidized products. It is not intended to apply any elaborate refining process to such complex mixtures to remove products of oxidation useful for other purposes it being rather the purpose of the present invention to carry out the oxidation with the intent of producing a motor fuel containing heavier constituents of the nature of kerosene or akin to it which however have been submitted to oxidizing treatment sufficiently to minimize the tendency of knocking which the raw kerosene itself displays when admixed in substantial quantity with ordinary gasoline.

From the foregoing it will be seen that in preparing the oxidized material forming a basis of the blended motor fuel mixture the oxidation may be carried out in various ways for example by charging kerosene or heavier oil into a still, heating to a temperature at which oxygen will react and forcing a current of oxygen or an oxygen-containing gas, e. g. air into this film. The more volatile products of reaction are withdrawn through a condenser which if desired may be maintained under pressure and the volatile spirit including more or less oxidized kerosene collected, refined sufficiently for motor fuel purposes and used as such or blended with other volatile fuels as noted.

On the other hand the oil may be separately cracked and then in admixture with air passed through a catalytic mass to bring about oxidation in this manner. In whichever way the oxidized material is prepared the resultant distillate consisting of gasoline containing oxidized bodies, or kerosene containing oxidized bodies, or mixtures of gasoline and kerosene containing oxidized bodies may be refined in any appropriate manner and admixed with the other constituents selected for blending purposes.

Gasoline made by the oxidation method in its crude state possesses an odor different from natural gasoline and this odor is somewhat objectionable. If the motor spirit is refined by sulphuric acid and alkali the odor may be removed but at the same time organic acid or other substances soluble in the acid or alkali may be extracted which are desirable in the fuel in order to minimize motor knocking. When this is the case the refining treatment may be carried out for example with hypochlorite or in such a way that the fuel is deodorized and if necessary bleached by agents which do not destroy or remove anti-knocking compounds formed by oxidation. By blending the raw or slightly refined product with natural gasoline or well refined pressure still gasoline the odor of the oxidized material may be thus rendered scarcely distinguishable simply by dilution.

By the term "chemically modified" as used in the claims, there are covered reaction products obtained by treatment of ingredients of the distillates themselves with a chemical agent.

What I claim is:—

1. A motor fuel comprising partially oxidized volatile hydrocarbons of petroleum derivation containing cracking- and oxidation-generated aromatic bodies.

2. A motor fuel comprising cracked and oxidized kerosene, containing light volatile products, cracking generated and oxidation treated aromatic bodies, products heavier than kerosene, and unchanged bodies of kerosene derivation.

3. An anti-knock motor fuel comprising volatile hydrocarbons of petroleum derivation containing aromatic products of cracking and oxidation, admixed with other liquid motor fuel material of a substantially volatile character.

CARLETON ELLIS.